US006211874B1

(12) United States Patent
Himmel et al.

(10) Patent No.: US 6,211,874 B1
(45) Date of Patent: Apr. 3, 2001

(54) METHOD FOR PARALLEL SELECTION OF URL'S

(75) Inventors: Maria Azua Himmel; Herman Rodriguez, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/080,020

(22) Filed: May 15, 1998

(51) Int. Cl.$^7$ .......................................... G60F 3/14
(52) U.S. Cl. .................. 345/340; 345/357; 345/339; 345/352; 707/501; 709/201; 709/219
(58) Field of Search ..................... 345/346, 340, 345/357, 356, 339, 347, 352; 707/501, 513; 709/201, 219, 217

(56) References Cited

U.S. PATENT DOCUMENTS

| | | |
|---|---|---|
| 5,021,989 | 6/1991 | Fujisawa et al. . |
| 5,625,781 * | 4/1997 | Cline et al. ............................ 345/356 |
| 5,649,186 * | 7/1997 | Ferguson ............................... 707/501 |
| 5,727,129 * | 3/1998 | Battett et al. ......................... 345/353 |
| 5,742,762 * | 4/1998 | Scholl et al. .......................... 709/200 |
| 5,742,768 | 4/1998 | Gennaro et al. . |
| 5,761,673 * | 6/1998 | Brookman et al. ................... 707/104 |
| 5,781,739 | 7/1998 | Bach et al. . |
| 5,799,151 | 8/1998 | Hoffer . |
| 5,867,651 | 2/1999 | Dan et al. . |
| 5,894,554 * | 4/1999 | Lowery et al. ....................... 709/203 |
| 5,908,469 | 6/1999 | Botz et al. . |
| 5,933,140 | 8/1999 | Strahorn et al. . |
| 5,933,142 | 8/1999 | LaStrange et al. . |
| 5,956,737 | 9/1999 | King et al. . |
| 5,959,623 | 9/1999 | van Hoff et al. . |

(List continued on next page.)

FOREIGN PATENT DOCUMENTS

| | | |
|---|---|---|
| 0 818 742 A1 | 1/1998 | (EP) . |
| 07282079 | 10/1995 | (JP) . |
| WO 97/49044 | 12/1997 | (WO) . |
| WO 98/20434 | 5/1998 | (WO) . |

OTHER PUBLICATIONS

M. Chalmers, K. Rodden, D. Brodbeck; "The order of things: activity–centered information access," 1998, pp. 359–367, Computer Networks and ISDN Systems 30; Elsevier Science B.V.

S.J. Carrière, R. Kazman: "WebQuery: searching and visualizing the Web through connectivity," 1997, pp. 1257–1267, Computer Networks and ISDN Systems; Elsevier Science B.V.

*Primary Examiner*—Raymond J. Bayerl
*Assistant Examiner*—Thomas T. Nguyen
(74) *Attorney, Agent, or Firm*—Richard A. Henkler; Felsman, Bradley, Vaden, Gunter & Dillon, LLP

(57) ABSTRACT

A method of accessing files located in a computer system, by selecting a plurality of embedded links (such as hypertext links) from one or more pages displayed in a browser window, and processing the plurality of embedded links concurrently. The embedded links may include at least two embedded links from a single page displayed in the browser window, or may include at least one embedded link from a first page and at least one other embedded link from a second page. In one implementation, a pop-up menu is displayed once the links have all been selected, wherein the pop-up menu has a plurality of menu items associated with different types of link processing. The types of link processing include: concurrently displaying pages associated with the plurality of embedded links in a plurality of respective browser windows on the display; concurrently printing pages associated with the plurality of embedded links using a printing device of the computer system; or concurrently downloading pages associated with the plurality of embedded links, to a storage device of the computer system. Selection of the links may be facilitated by allowing the user to switch to a multi-link selection mode.

34 Claims, 8 Drawing Sheets

U.S. PATENT DOCUMENTS

| | | |
|---|---|---|
| 5,978,836 | 11/1999 | Ouchi . |
| 5,983,369 | 11/1999 | Bakoglu et al. . |
| 6,003,032 | 12/1999 | Bunney et al. . |
| 6,006,252 | 12/1999 | Wolfe . |
| 6,011,537 | 1/2000 | Slotznick . |
| 6,012,090 | 1/2000 | Chung et al. . |
| 6,023,722 | 2/2000 | Colyer . |
| 6,025,837 | 2/2000 | Matthews, III et al. . |
| 6,028,601 | 2/2000 | Machiraju et al. . |
| 6,081,263 | 6/2000 | LeGall et al. . |

\* cited by examiner

METHOD FOR PARALLEL SELECTION OF URL'S

BACKGROUND OF THE INVENTION

1. Field of the Invention

The present invention generally relates to computer systems, and more specifically to a method and system for accessing interrelated computer files, particularly files distributed across a network, such as pages on the World Wide Web of the Internet, using viewing software such as a web browser that provides hypertext links between interrelated pages.

2. Description of Related Art

A generalized client-server computing network 2 is shown in FIG. 1. Network 2 has several nodes or servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at another set of nodes, or workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). A single, physical computer can act as both a server and a client, although this implementation occurs infrequently.

The information provided by a server can be in the form of programs which run locally on a given client 12, or in the form of data such as files that are used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail, simple file transfers via FTP (file transfer protocol), remote computing via Telnet, "gopher" searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http://www.uspto.gov" (home page for the United States Patent & Trademark Office) specifies a hypertext transfer protocol ("http") and a pathname of the server ("www.uspto.gov"). The server name is associated with a unique numeric value (a TCP/IP address, or "domain").

The present invention relates to accessing computer files, particularly those that are distributed on a network like the Internet, and more particularly to those accessed using the WWW, which provides files that are conveniently linked for user access. For example, as illustrated in FIG. 2, a group 14 of files or pages 16a–16h are interrelated by providing hypertext links in each of the files (group 14 may thus be considered a typical web site). A hypertext link is any image that is viewable on the workstation's display 18, which can be selected by the user (e.g., using a pointing device or "mouse") and which then automatically instructs client workstation 12 to request another page associated with that particular hypertext link (i.e., issue another URL). A hypertext link may appear as a picture, or as a word or sentence, possibly underlined or otherwise accentuated to indicate that it is a link and not just normal, informative text.

A WWW page may have text, graphic (still) images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep.wav". When a client workstation 12 sends a request to a server for a page, such as page 16a, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor 18 as shown in FIG. 2. A page may be "larger" than the physical size of the monitor screen (i.e., larger than the software-programmed "window" provided for viewing the page), and techniques such as scroll bars are used by the viewing software (the web browser) to view different portions of the page. Selection of a hypertext link sometimes opens a new (second) browser window to receive the requested page.

One problem that frequently occurs during navigation of a web site relates to the repetitious and slow process of viewing multiple links within a web page. For example, a user might want to review several chapters of a book or instruction manual that is provided on the WWW in the form of a main page that acts as a table of contents, and many other pages which each constitute one of the chapters of the book or manual. The web site may be constructed such that the user can only access a particular chapter from the main (table of contents) page. Thus, the user would be required to enter a cumbersome sequence of multiple mouse clicks to examine multiple links in a page. When a user clicks on a URL which is brought up in the current window, and after the user is finished with the retrieved page, the user must select the "Back" button in the browser to reload the previous page (a keystroke combination entered on the keyboard may also be used to activate the "Back" feature), and then select another page from the table of contents. This back-and-forth sequence between viewing a particular chapter and viewing the table of contents page must be repeated for each chapter.

This problem is aggravated if several links are taken from the main page, e.g., to footnotes that are provided as links within a given chapter. If this occurs, then the "Back" button will have to be hit for each page visited, which can be very time consuming, especially with the growing use of the Internet and since the user has to wait until the previous page has started to download to the browser before the "Back" button can be pressed again. Although the pages are often stored in a cache memory locally in the computer, many web pages now require reconnection with the host server before the page can be fully reloaded, which can take a significant amount of time.

Another method that can be used return to a previous page, without using the "Back" button, is the "history" window or menu which is available on most browsers. The history window is essentially a list of URLs visited in a given session. The history table, however, has its limitations. First, the average user is not familiar with the history feature, because it is embedded within a pull-down window (i.e., not presented in the main browser window as a button). Secondly, the user must locate the URL of the desired previous page from among the list of possibly many URLs in the history table. Finally, even if the user can jump directly back to the desired page, this window must reload within the browser, which can again take several minutes, and slows down the computer since more resources are being used to present the page (audibly and/or visually).

With current web browsers, link selection methods are thus very limited, and no support is provided to simplify accessing multiple links on a given page. It would, therefore, be desirable to devise a method and system of accessing computer files, such as WWW pages, which allowed multiple links to be selected. It would be further advantageous if the method and system supported such multiple link selection without having to backtrack to the page that contains multiple selections.

SUMMARY OF THE INVENTION

It is therefore one object of the present invention to provide an improved method of accessing interrelated files on a computer system.

It is another object of the present invention to provide such a method wherein the computer files are presented in the form of pages having links, such as hypertext links, which facilitate loading of related pages.

It is yet another object of the present invention to provide such a method which simplifies selection of multiple of hypertext links in a given page.

The foregoing objects are achieved in a method of accessing files located in a computer system, generally comprising the steps of creating a browser window on a display of the computer system, selecting a plurality of embedded links (such as hypertext links) from at least one page displayed in the browser window, and processing the plurality of embedded links concurrently. The embedded links may include at least two embedded links from a single page displayed in the browser window, or may include at least one embedded link from a first page and at least one other embedded link from a second page. A graphical pointer may be used to select the embedded links. In one implementation, a pop-up menu is displayed once the links have all been selected, wherein the pop-up menu has a plurality of menu items associated with different types of link processing. For example, the processing step may include: the step of concurrently displaying pages associated with the plurality of embedded links in a plurality of respective browser windows on the display; the step of concurrently printing pages associated with the plurality of embedded links using a printing device of the computer system; or the step of concurrently downloading pages associated with the plurality of embedded links, to a storage device of the computer system. Selection of the links may be facilitated by allowing the user to switch to a multi-link selection mode.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
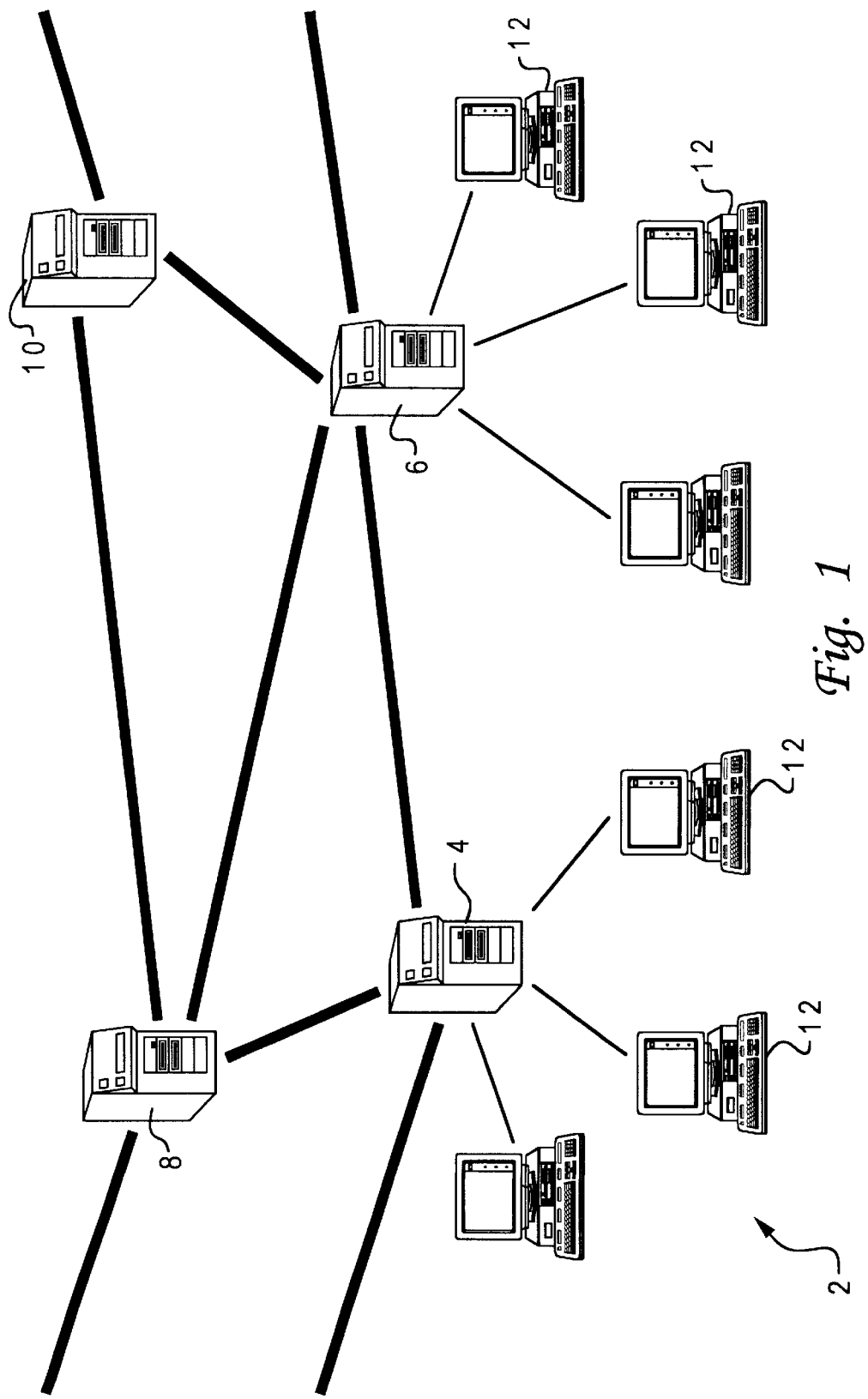
FIG. 1 is a diagram of a conventional computer network, including interconnected servers and client workstations.
Figure 2:
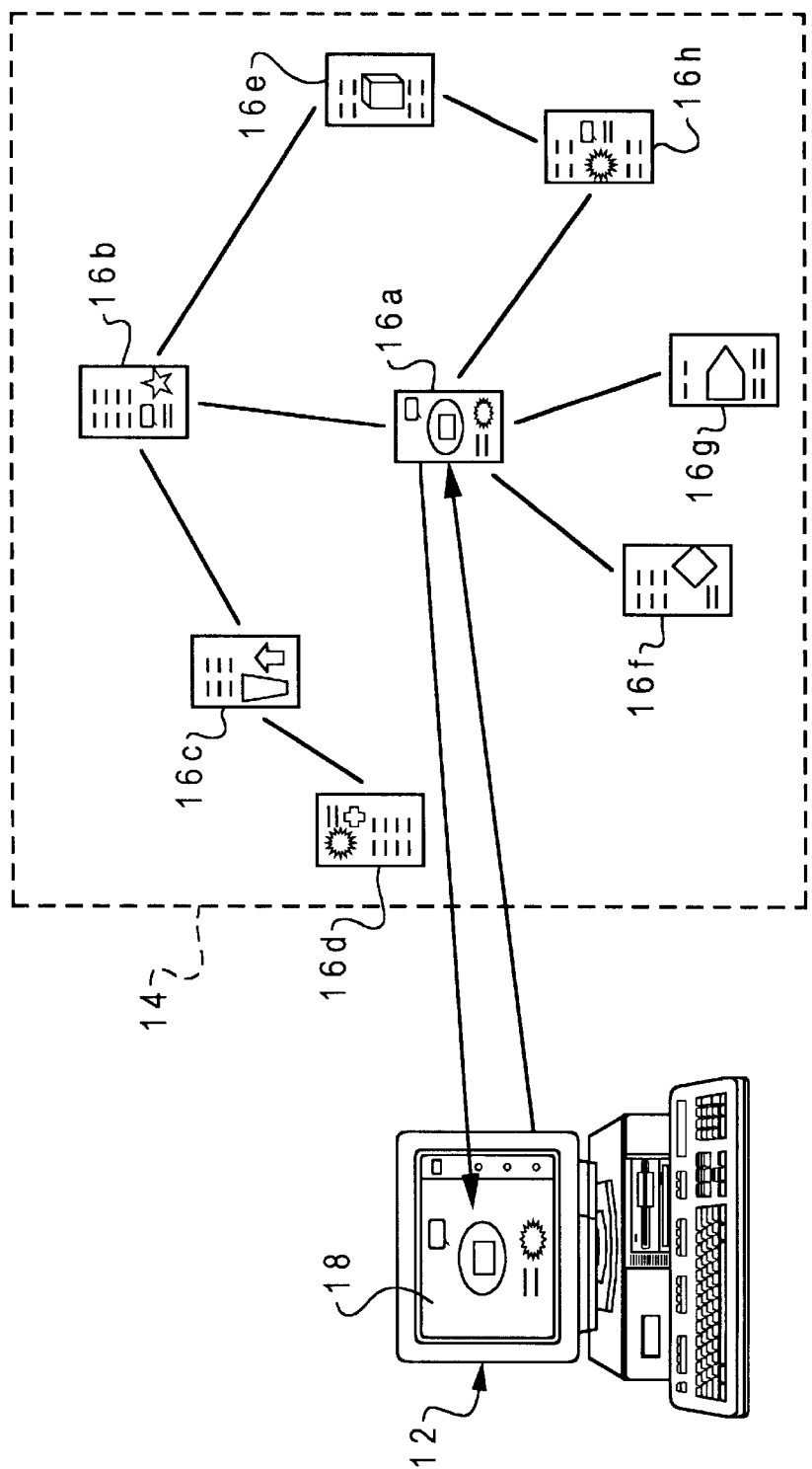
FIG. 2 is a pictorial representation of the retrieval of an object from a set of linked objects residing on the network, such as a page on the World Wide Web.

The present invention is directed to a method of accessing files located in a computer system, particularly files that are distributed across a computer network such as the network of FIG. 1. The invention may, however, be implemented in other networks besides the Internet so, while the present invention may be understood with reference to FIG. 1, this reference should not be construed in a limiting sense.

Figure 3:
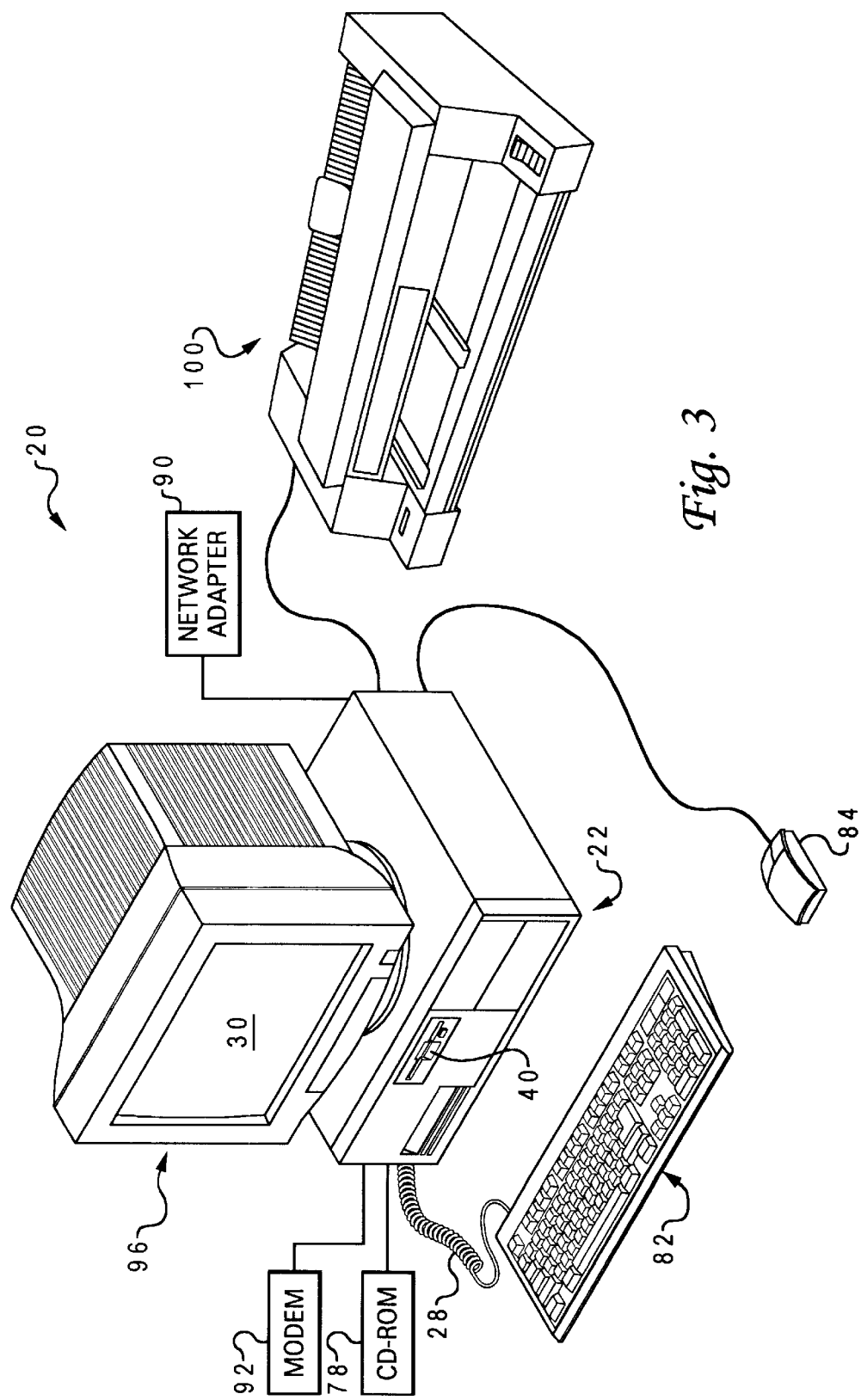
FIG. 3 is an illustration of one embodiment of a data processing system in which the present invention can be practiced.

With further reference to FIG. 3, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 4:
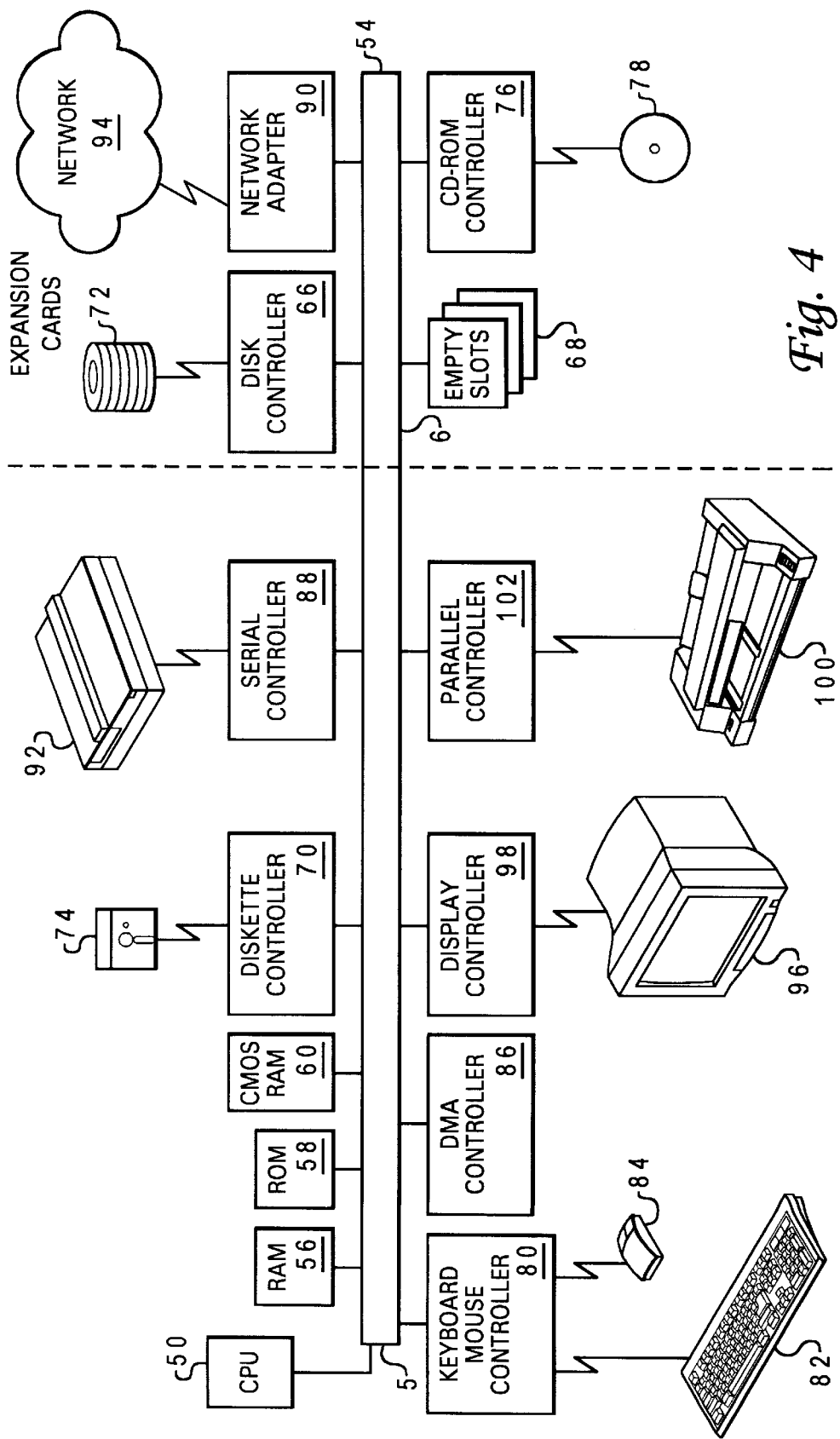
FIG. 4 is a high-level block diagram illustrating selected components that can be included in the data processing system of FIG. 3 according to the teachings of the present invention.

Reference now being made to FIG. 4, a high level block diagram is shown illustrating selected components that can be included in the data processing system 20 of FIG. 3 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and A nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 4, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 4. Those skilled in the art will appreciate that a data processing system constructed in accordance with the present invention may have multiple components selected from the foregoing, including even multiple processors.

Referring now to FIGS. 5A–5D, one embodiment of the present invention allows data processing system 20 to explore files located on system 20, or located on networks which are connected to system 20 (such as local area network 94, or the Internet which may be connected via modem 92). The depicted implementation provides one or more browser windows to view interrelated files, that is, files having embedded links such as hypertext links.

Figure 5A:
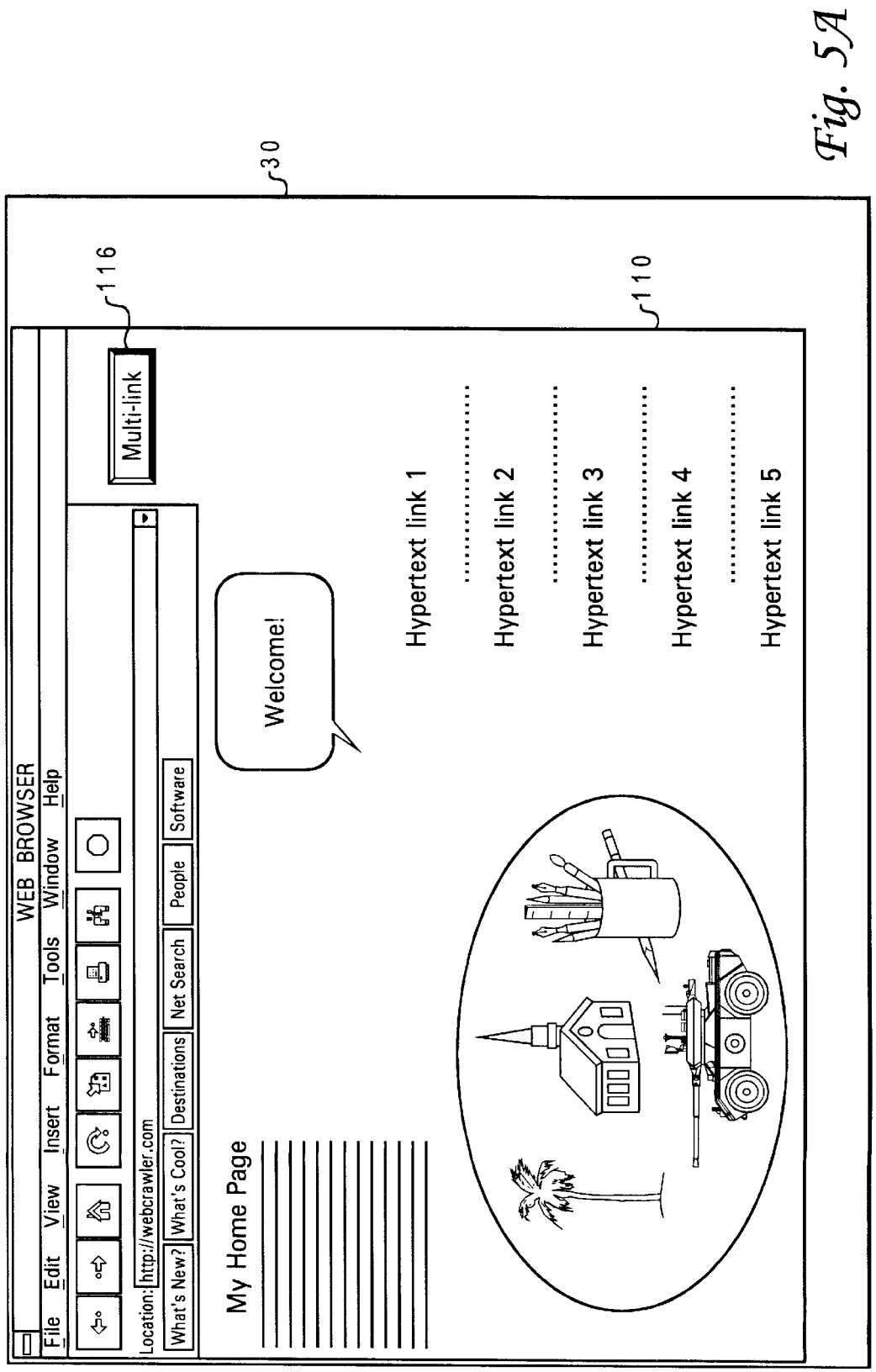
FIGS. 5A–5D are elevational views of a graphical user interface employed by a browser program constructed in accordance with the present invention.

As seen in FIG. 5A, browser software constructed in accordance with this implementation displays a main browser window 110 on monitor 30. Browser window 110 includes an image of a currently viewed page, such as a user's home page, a page that was retrieved using a search engine, etc. The page may contain textual material as well as multimedia content, and further includes a plurality of hypertext links. The present invention allows for selection of multiple links within such a web page, so that concurrent processing may be applied to the links, such as by opening separate browser windows for each of the links so selected. Selection of multiple URLs may be achieved by pointing the graphical pointer to each desired URL selectable field (hypertext or image link) on the web page using mouse 84, and then actuating (clicking) one of the mouse buttons while entering a unique control key sequence (e.g., depressing the "ctrl" and "alt" keys of a typical keyboard). Selected URLs could be de-selected by repeating the same selection method on a link to a URL which has already been selected.

Once all desired links have been so specified, the user presses the "Enter" key on keyboard 82, or clicks on an appropriate button displayed by browser window 110. The browser software then opens as many sessions (sockets) as are needed to present the number of pages requested by the user, and concurrently fetches the requested pages. The number of additional windows opened could be N−1, where N is the number of links selected by the user via the special control key sequence, with the first newly selected page being retrieved into the original browser window 110, or the number could be N, with the original page maintained in the original window, and a new window opened for each newly selected page, as shown in FIGS. 5B–5C.

Figure 5B:
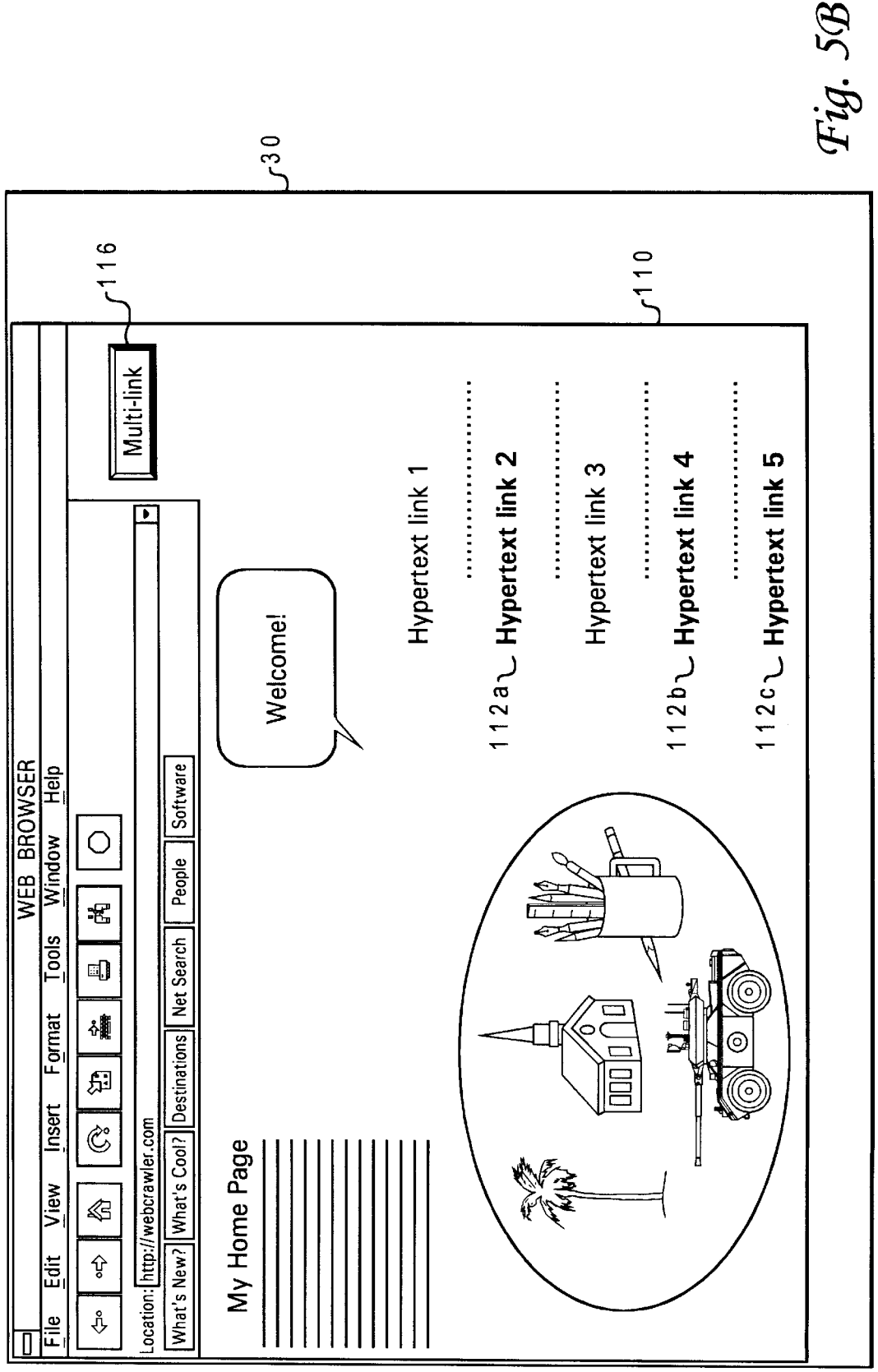
Figure 5C:
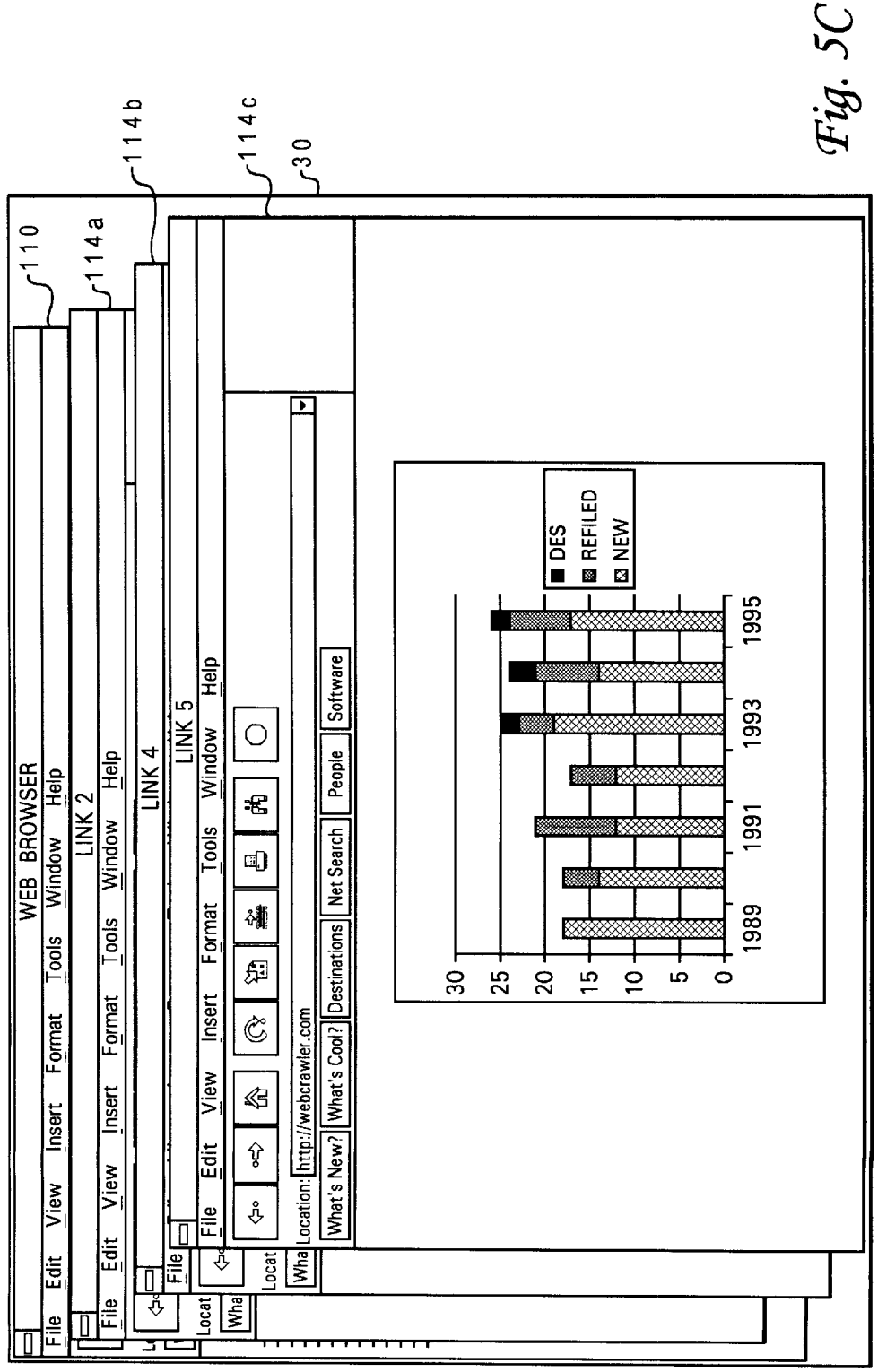

FIG. 5B depicts the selection of three links: "hypertext link 2" 112a, "hypertext link 4" 112b, and "hypertext link 5" 112c. These links are displayed with boldface font in FIG. 5B to indicate that they are visually highlighted for the user, but this highlighting can take other forms, such as displaying selected links in a different color (e.g., a link is normally displayed in blue color, but changes to purple color when it has been selected for multi-link processing). When the user then hits the "Enter" key, three new windows 114a, 114b and 114c appear as shown in FIG. 5C, which retrieve the pages (entitled "LINK 2," "LINK 4," and LINK 5") respectively associated with links 112a, 112b and 112c. While windows 114a, 114b and 114c are shown as less than the full size of monitor 30, those skilled in the art will appreciate that these windows can also operate in a full-sized ("maximized") mode. Although text fields are shown in FIG. 5B for the selected hypertext links, it is understood that the present invention can provide for the selection of multiple links wherein one or more of the links are also associated with graphic items (image fields).

The method of the present invention applies to both mouse selection and keyboard selection of links. For example, conventional browsers use the tab key to move between (focus on) hypertext links in a page. The present invention may be implemented in a novel browser which allows multi-link selection by entering a special keystroke after focussing on a link using the tab key, or by hitting the tab key in combination with other keys.

In an alternative implementation, the browser software of the present invention allows a user to enter a multi-link selection mode, using various techniques. For example, a special keystroke combination might be used to initiate the multi-link selection mode and, while this mode is in effect, clicking the mouse on any link (in an otherwise normal manner) will cause the link to be selected for eventual multi-link processing. Similarly, a special field or button in the browser may be used to switch the program into the multi-link selection mode, such as the "Multi-link" button 116 depicted in FIGS. 5A–5D. In this implementation, when the user first clicks on button 116, the program enters the multi-link selection mode and, after the links have been selected, clicking on button 116 a second time results in the selected links being retrieved (if no links have been selected, then clicking on button 116 the second time will have no effect other than to disable the multi-link selection mode, i.e., return the browser to the direct link mode wherein clicking on a link immediately loads the single associated page).

In a variation of this embodiment, a small window or input box (not shown) can appear which records a list of the URLs selected while the browser is in multi-link selection mode. Selected URLs could be de-selected by deleting a line from the input box. This approach also allows a user to conveniently designate a URL for multi-link processing even when the URL is not present on the displayed web page, by directly entering the URL in the input box (i.e., using keyboard 82 to type the URL, or using the mouse to copy the URL from some other source and "paste" it into the input box).

Figure 5D:
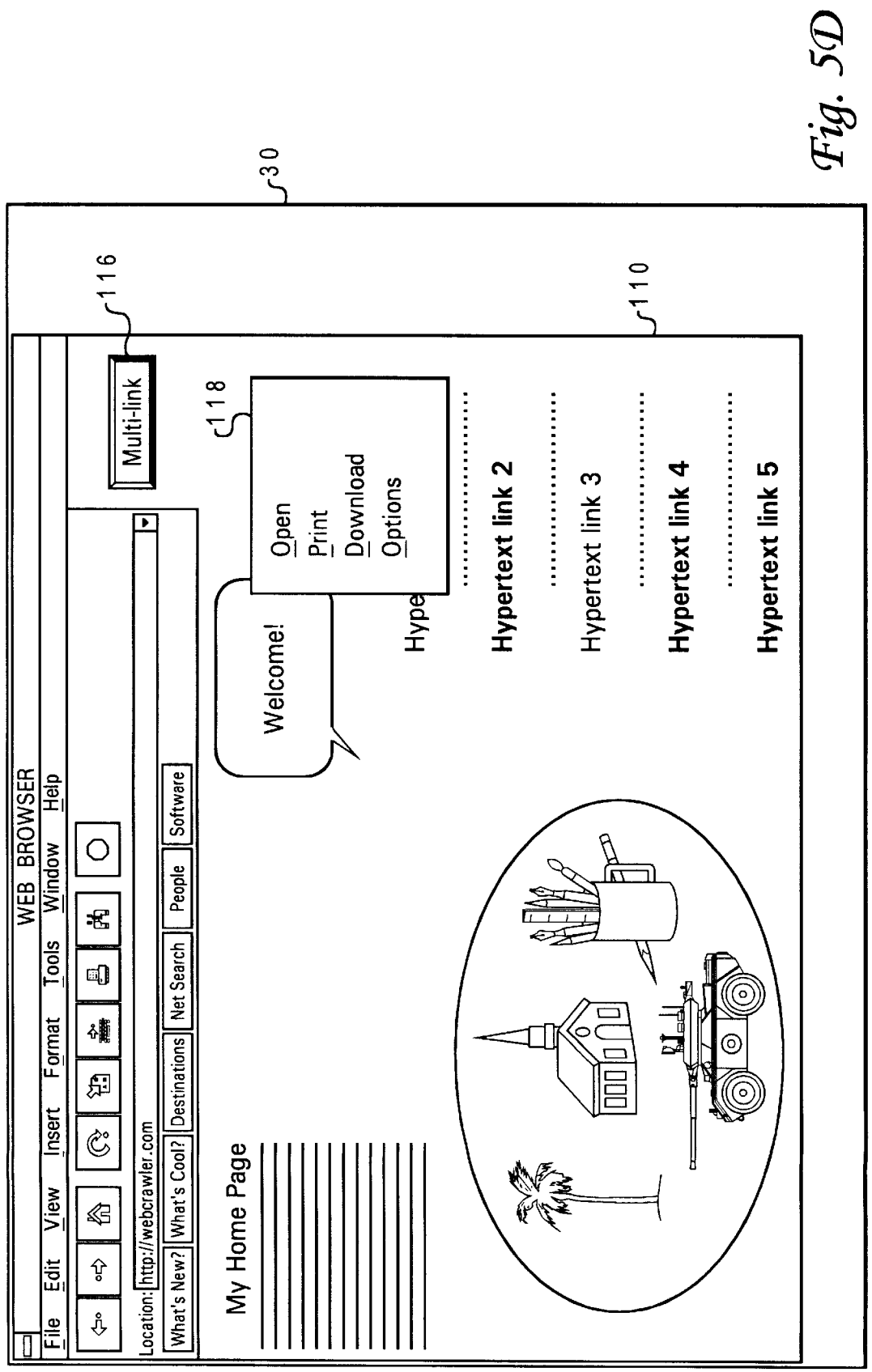

The present invention contemplates other forms of multi-link processing besides simply opening the selected pages. FIG. 5D depicts a further embodiment wherein selected links can be concurrently printed or downloaded as well. In this embodiment, a small window or pop-up menu 118 provides a means for specifying what type of multi-link processing is desired. In the previously described implementation using "Multi-link" button 116, menu 118 might appear when the user clicks on button 116 the second time (after one or more links have been selected). The user then selects the appropriate menu item in menu 118 (using the mouse or keyboard), and the browser executes the requested type of processing.

Thus, if the "Print" item in menu 118 is selected, then the pages associated with all selected links will be retrieved and printed automatically (the browser may first present an additional window (not shown) that allows the user to enter various print options, such as the number of copies, print quality, etc.). Similarly, if the "Download" item in menu 118 is selected, then the pages associated with all selected links will be retrieved and saved on a designated storage device (e.g., a local hard disk, or a remote network disk drive). Printing and downloading may be carried out without opening the pages (creating the extra browser windows on monitor 30 and displaying the pages in the windows) in order to save system resources and speed up multi-link processing.

In the embodiment of FIG. 5D, menu 118 is also provided with an "Options" item. This line may be selected to allow the user to specify various parameters for multi-link processing. For example, the user may desire to print only textual material in the pages associated with the selected links (that is, the user may wish to omit graphic images in the printout). Similarly, the user might want to download all files associated with a page, except for files of certain types, e.g., audio files. Another option could postpone multi-link processing until additional links had been selected from other pages. In other words, the user could selected one or more links from a first page, then indicate in the options parameters that other links were to be provided from other pages, which would allow the user to load these other pages and select additional links, so that a plurality of links from several different pages could be processed in one batch. This convenience allows the user to select a very large number of links, and then undertake some other task while all of those links are being processed.

All of the foregoing functions can be programmed directly into the browser. Alternatively (or additionally), the functions could be implemented using other indirect programming techniques that are supported by the browser. For example, many conventional browsers support Java (a programming language developed by Sun Microsystems) or Javascript (a scripting language developed by Netscape Communications and Sun Microsystems that can be used in conjunction with Java). Thus, a Java "applet" may be constructed to provide these functions.

The present invention accordingly provides an easy-to-use method for conveniently processing multiple requests from one or more pages, without having to backtrack to a page that contain multiple selections. A browser constructed in accordance with the present invention can retain the current behavior and user interaction of conventional browsers, and provide this extended functionality without increasing the visual complexity of browser (or with only slight additions to the graphical interface). It also possesses the flexibility of achieving this functionality using either keyboard commands or pointer interactions.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention has been explained in the context of a file system distributed over a network, the invention is equally applicable to systems in which all (or a portion) of the files are maintained on a local storage medium. It is therefore contemplated that such modifications can be made without departing from the spirit or scope of the present invention as defined in the appended claims.

What is claimed is:

1. A method of accessing files located in a computer system, comprising the steps of:

creating a browser window on a display of the computer system;

displaying at least one page in the browser window, the page having a plurality of embedded links, wherein a given one of the links may be individually selected by a user to request downloading of one of a plurality of different, respective pages;

specifying a set of the plurality of embedded links from the at least one page displayed in the browser window for concurrent processing, wherein said specifying step occurs without issuing any request to download any pages associated with the embedded links in the set; and after said specifying step, processing the plurality of embedded links in the set concurrently in response to a single user input by issuing requests for the pages associated with the embedded links and downloading those pages concurrently.

2. The method of claim 1 wherein said step of selecting a plurality of embedded links includes the step of selecting at least two embedded links from a single page displayed in the browser window.

3. The method of claim 1 wherein said step of selecting a plurality of embedded links includes the steps of:

selecting at least one embedded link from a first page displayed in the browser window; and selecting at least one other embedded link from a second page displayed in the browser window.

4. The method of claim 1 further comprising the step of creating the page by loading content from a plurality of files into the browser window.

5. The method of claim 1 further comprising the step of creating the embedded links using hypertext fields.

6. The method of claim 1 wherein said selecting step includes the steps of:

moving a graphical pointer of the display to a given one of the embedded links, using a pointing device; and actuating a button of the pointing device while the graphical pointer is directed at the given embedded link.

7. The method of claim 1 further comprising the step of displaying a pop-up menu having a plurality of menu items associated with different types of link processing.

8. The method of claim 1 wherein said processing step includes the step of concurrently displaying pages associated with the plurality of embedded links in a plurality of respective browser windows on the display.

9. The method of claim 1 wherein said processing step includes the step of concurrently printing pages associated with the plurality of embedded links using a printing device of the computer system.

10. The method of claim 1 wherein:

the associated pages are distributed across a network of the computer system; and said downloading step further comprises the step of transmitting the associated pages to a node of the computer system.

11. The method of claim 1 wherein said selecting step includes the step of switching the browser window to a multi-link selection mode.

12. The method of claim 11 wherein said switching step includes the steps of:

moving a graphical pointer of the display to a control button of the browser window, using a pointing device; and actuating a button of the pointing device while the graphical pointer is directed at the control button.

13. A computer system comprising:

a display;

a processor connected to said display; and program instructions controlling said processor to (i) create a browser window on said display, (ii) display at least one page in the browser window, the page having a plurality of embedded links, wherein a given one of the links may be individually selected by a user to request downloading of one of a plurality of different, respective pages, (iii) specify a set of the plurality of embedded links from the at least one page displayed in the browser window for concurrent processing without issuing any request to download any pages associated with the embedded links in the set, and (iv) after specifying the set, process the plurality of embedded links in the set concurrently in response to a single user input by issuing requests for the pages associated with the embedded links and downloading those pages concurrently.

14. The computer system of claim 13 wherein said program instructions control said processor to select the plurality of embedded links by selecting at least two embedded links from a single page displayed in the browser window.

15. The computer system of claim 13 wherein said program instructions control said processor to select the plurality of embedded links by selecting at least one embedded link from a first page displayed in the browser window, and selecting at least one other embedded link from a second page displayed in the browser window.

16. The computer system of claim 13 wherein said program instructions further control said processor to create the embedded links using hypertext fields.

17. The computer system of claim 13 further comprising a pointing device connected to said processor, wherein said program instructions control said processor to select a given one of the plurality of embedded links in response to actuation of a button of said pointing device while a graphical pointer of said display, controlled by said pointing device, is directed at the given embedded link.

18. The computer system of claim 13 wherein said program instructions control said processor to display a pop-up menu in the browser window, the pop-up menu having a plurality of menu items associated with different types of link processing.

19. The computer system of claim 13 wherein said program instructions control said processor to process the plurality of embedded links by concurrently displaying pages associated with the plurality of embedded links in a plurality of respective browser windows on said display.

20. The computer system of claim 13 further comprising a printing device connected to said processor, wherein said program instructions control said processor to process the plurality of embedded links by concurrently printing pages associated with the plurality of embedded links using said printing device.

21. The computer system of claim 13 wherein the associated pages are distributed across a network connected to the computer system.

22. The computer system of claim 13 wherein said program instructions control said processor to select the plurality of embedded links by switching the browser window to a multi-link selection mode.

23. The computer system of claim 22 further comprising a pointing device connected to said processor, wherein said program instructions control said processor to switch the browser window to the multi-link selection mode in response to actuation of a button of said pointing device while a graphical pointer of said display, controlled by said pointing device, is directed at a control button of the browser window.

24. A computer program product comprising:
   a storage medium adapted to be read by a computer; and
   program means stored on said storage medium for (i) creating a browser window on a display of the computer system, (ii) displaying at least one page in the browser window, the page having a plurality of embedded links, wherein a given one of the links may be individually selected by a user to request downloading of one of a plurality of different, respective pages, (iii) specifying a set of the plurality of embedded links from the at least one page displayed in the browser window for concurrent processing, without issuing any request to download any pages associated with the embedded links in the set, and (iv) after specifying the set, processing the plurality of embedded links in the set concurrently in response to a single user input by issuing requests for the pages associated with the embedded links and downloading those pages concurrently.

25. The computer program product of claim 24 wherein said program means selects the plurality of embedded links by selecting at least two embedded links from a single page displayed in the browser window.

26. The computer program product of claim 24 wherein said program means selects the plurality of embedded links by selecting at least one embedded link from a first page displayed in the browser window, and selecting at least one other embedded link from a second page displayed in the browser window.

27. The computer program product of claim 24 wherein said program means creates the page by loading content from a plurality of files into the browser window.

28. The computer program product of claim 24 wherein said program means displays the embedded links as hypertext fields.

29. The computer program product of claim 24 wherein said program means selects the plurality of embedded links in response to actuation of a button of a pointing device of the computer system while a graphical pointer of the display, controlled by the pointing device, is directed at the given embedded link.

30. The computer program product of claim 24 wherein said program means further displays a pop-up menu in the display, the pop-up menu having a plurality of menu items associated with different types of link processing.

31. The computer program product of claim 24 wherein said program means processes the plurality of embedded links by concurrently displaying pages associated with the plurality of embedded links in a plurality of respective browser windows on the display.

32. The computer program product of claim 24 wherein said program means processes the plurality of embedded links by concurrently printing pages associated with the plurality of embedded links using a printing device of the computer system.

33. The computer program product of claim 24 wherein said program means selects the plurality of embedded links by switching the browser window to a multi-link selection mode.

34. The computer program product of claim 24 wherein said program means switches to the multi-link selection mode in response to actuation of a button of a pointing device of the computer system while a graphical pointer of the display, controlled by the pointing device, is directed at a control button of the browser window.

* * * * *